(12) United States Patent
Correale

(10) Patent No.: US 7,334,481 B2
(45) Date of Patent: Feb. 26, 2008

(54) PRESSURE SENSOR WITH IMPROVED VIBRATING MICROASSEMBLY AND OPTICAL DETECTION SYSTEM

(75) Inventor: Raffaele Correale, Turin (IT)

(73) Assignee: Varian S.p.A., Leini, Turin (IT)

( * ) Notice: Subject to any disclaimer, the term of this patent is extended or adjusted under 35 U.S.C. 154(b) by 0 days.

(21) Appl. No.: 11/430,403

(22) Filed: May 9, 2006

(65) Prior Publication Data

US 2006/0266124 A1 Nov. 30, 2006

(30) Foreign Application Priority Data

May 10, 2005 (IT) ............................ TO2005A0316

(51) Int. Cl.
*G01L 11/00* (2006.01)
(52) U.S. Cl. ........................................ 73/702
(58) Field of Classification Search .................. 73/702
See application file for complete search history.

(56) References Cited

U.S. PATENT DOCUMENTS

| 4,345,482 | A | * | 8/1982 | Adolfsson et al. | ....... 73/862.59 |
| 4,841,775 | A | | 6/1989 | Ikeda et al. | |
| 5,152,173 | A | | 10/1992 | Willson | |
| 5,426,981 | A | | 6/1995 | Cook et al. | |
| 5,528,939 | A | | 6/1996 | Martin et al. | |
| 5,546,810 | A | * | 8/1996 | Arikawa et al. | ............... 73/702 |
| 5,550,516 | A | | 8/1996 | Burns et al. | |
| 6,085,594 | A | * | 7/2000 | Gutierrez et al. | ............. 73/704 |
| 6,532,822 | B1 | | 3/2003 | Boyd | |
| 7,059,192 | B2 | * | 6/2006 | Correale et al. | ............... 73/702 |

\* cited by examiner

*Primary Examiner*—Andre J. Allen
(74) *Attorney, Agent, or Firm*—Bella Fishman

(57) ABSTRACT

A pressure sensor made of a wafer with a pair of parallel silicon layers and a silicon oxide layer there between, comprises a vibrating microassembly formed as a silicon beam, which is arranged in a plane perpendicular to the silicon layers and fastened to a supporting base. A control devise is formed from a portion of one of the silicon layers and is driven by a signal of a predetermined frequency component, which under absolute vacuum conditions makes the microassembly to freely oscillate at a known frequency and amplitude relative to the supporting base within a cavity formed by removing the silicon oxide layer. An optical detection system detects deviations of the frequency and/or amplitude of oscillation of the microassembly from the known frequency and/or amplitude.

17 Claims, 5 Drawing Sheets

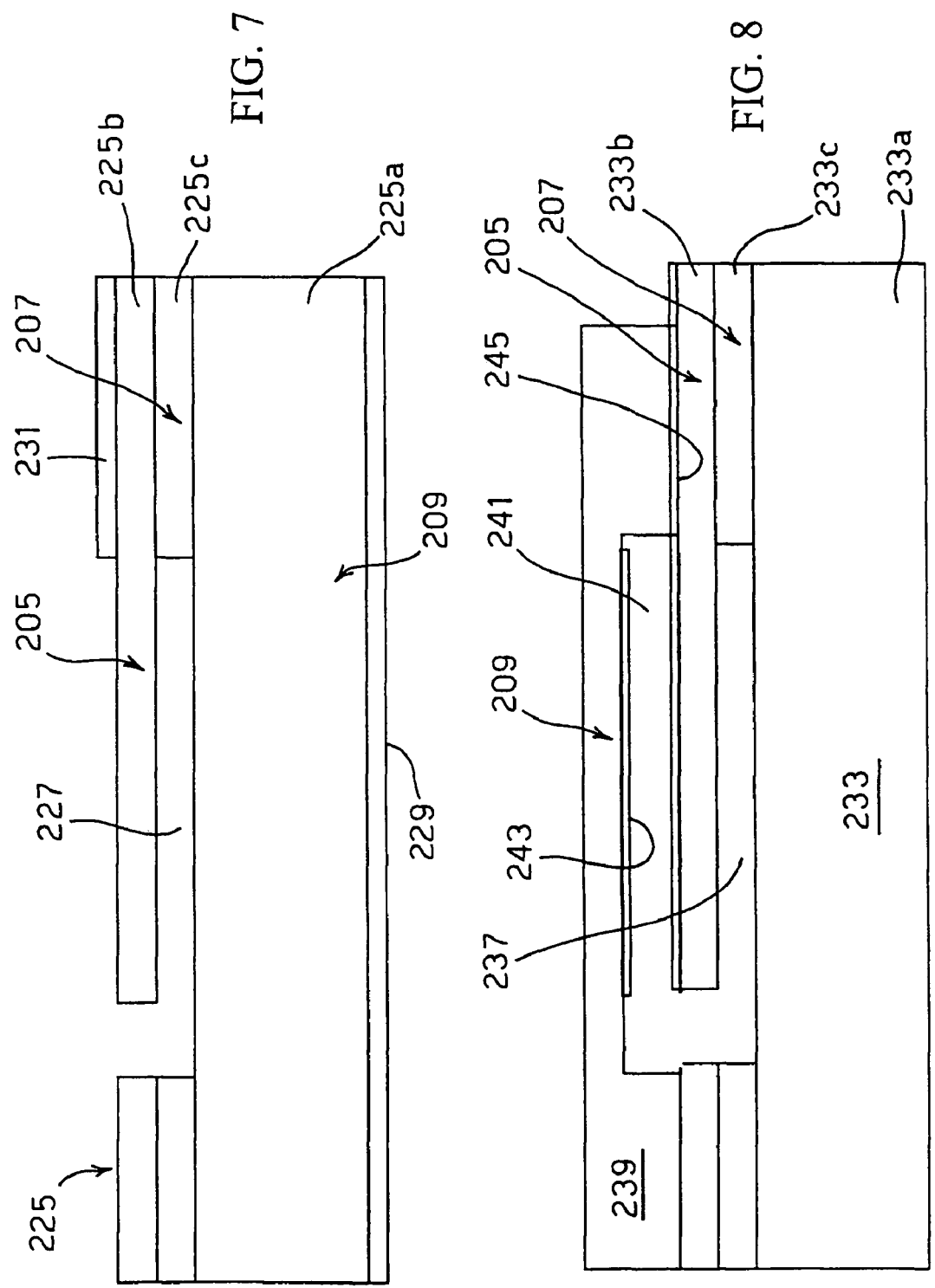

PRESSURE SENSOR WITH IMPROVED VIBRATING MICROASSEMBLY AND OPTICAL DETECTION SYSTEM

BACKGROUND OF THE INVENTION

The present invention relates to a pressure sensor.

More particularly, the present invention concerns a pressure sensor comprising a vibrating member, of which the oscillation frequency and amplitude are affected by the pressure conditions of the environment where the member is located, and can therefore be exploited to measure pressure variations in the surrounding environment.

Pressure sensors, as well as, for example, temperature, density sensors, employing a vibrating member are already known. These sensors exploit the influence of the pressure, temperature and/or density conditions of the external environment on the oscillation frequency and amplitude of the vibrating member, and allow calculating the variations of the pressure, temperature or density by measuring the deviations of the oscillation frequency and amplitude from the expected values.

Sensors of the above kind are disclosed for instance in the U.S. Pat. Nos. 4,841,775, 5,152,173 and 5,426,981.

The contemporary development of the technology of microelectromechanical devices (MEMs) has allowed manufacturing miniaturised sensors, consisting of a substrate onto which a single-layer or multilayer vibrating microassembly is formed. The substrate and the vibrating microassembly are made, for instance, of silicon, silicon oxide, molybdenum, aluminium, etc.

A microelectromechanical device is illustrated by way of example in FIG. 1.

The microelectromechanical device 100 comprises a vibrating microassembly formed as a planar membrane 102 suspended above a cavity 104 formed in a supporting base 106. The supporting base 106 is preferably a silicon substrate or wafer, where cavity 104 is formed by conventional etching techniques. The membrane 102 has a substantially rectangular shape and is fastened to peripheral rim 108 surrounding cavity 104 in supporting base 106 at two rectangular fastening regions 110$a$, 110$b$ adjacent to the minor sides of membrane 102. The membrane is further provided with a side extension 112 partly overlapping peripheral rim 108, so as to define a corresponding contact area 114. A metal control electrode 118 is located inside cavity 104, in contact with bottom 116 thereof, and is provided with a side extension 120 bent against side wall 122 of cavity 104. That extension partly covers peripheral rim 108 of supporting base 106 and defines a corresponding contact area 124. By applying a periodically modulated excitation voltage signal to said areas 124, 114 in control electrode 118 and membrane 102, respectively, a variable electric field can be produced between control electrode 118 and membrane 102, whereby membrane 102 is made to vibrate. Under absolute vacuum conditions, membrane 102, suitably excited, will vibrate at the resonance frequency and amplitude corresponding to vacuum conditions (intrinsic frequency and amplitude), or, if the voltage signal is a sinusoidal signal whose frequencies are different from the resonance frequency, the membrane will vibrate at the frequency imposed by said signal. When departing from the ideal condition of absolute vacuum, the presence of gas molecules or atoms in the environment surrounding the membrane will affect the frequency and amplitude of the membrane oscillations, since the free vibration of the membrane will be perturbed by the collisions with atoms and molecules. The higher the number of the atoms and molecules, hence the higher the pressure of the environment where the sensor is located, the stronger the influence. Consequently, by measuring the deviations of the frequency and/or amplitude of the vibration of membrane 102 from the expected values by means of a suitable detector, the pressure variations in the surrounding environment can be determined. Suitable materials for manufacturing membrane 102 may be aluminium, molybdenum, $SiO_2$, $Si_3N_4$, Si (single crystalline). Moreover, membranes made of dielectric material, such as $SiO_2$ and $Si_3N_4$, will have a sandwich structure (dielectric-metal-dielectric), with a metal layer sandwiched between two dielectric layers, so that the membrane vibration can be controlled by the electric field.

Miniaturised pressure sensors obtained by using microelectromechanical devices are disclosed, for instance, in the U.S. Pat. Nos. 5,528,939, 5,550,516 and 6,532,822.

Generally, in the prior art sensors, the microelectromechanical member is inserted into an electric circuit, and the variations of the oscillation amplitude and/or frequency of the vibrating microassembly, which relates to pressure variation, are detected from the variations of an electric parameter of the circuit.

A drawback of the prior art devices is that the measurement of the variations of the oscillation frequency and/or amplitude of the vibrating microassembly is a capacitive measurement: this prevents a direct detection of the variations, and hence, a precise and accurate measurement. According the prior art, the vibrating microassembly is placed between the plates of a capacitor belonging to the electric circuit or, possibly, the microassembly forms one of the plates of the capacitor, so that the variations in the frequency and/or amplitude of its oscillation entails capacitance variations. Yet, since measuring variations of a capacitance, which is already variable per se because of the oscillatory motion of the vibrating microassembly, would be an extremely complex, difficult to be performed in practice operation, a direct detection of the variations in the frequency and/or amplitude of the oscillatory motion is not performed. It is requested to maintain the constant value of the capacitance equal to the theoretical value, which it would have if the vibrating microassembly would oscillate with the expected frequency and amplitude values.

SUMMARY OF THE INVENTION

It is therefore an object of the present invention to overcome the above limitations. A pressure sensor of the present invention comprises a vibrating microassembly and an optical detection system, which allows for performing a direct detection of the deviations of the oscillation frequency and/or amplitude from the expected values, due to pressure variation in the surrounding environment.

It is another object of the present invention to provide a pressure sensor that can be used with sufficient reliability within a wide range of pressure values.

It is a further object of the present invention to provide a pressure sensor that exhibits a high detection sensitivity and repeatability.

The above and other objects are achieved by the pressure sensor as claimed in the appended claims.

Since the detection of the variations of the oscillation frequency and/or amplitude of the vibrating microassembly is not a type of capacitive detection, by using the sensor according to the invention the frequency and/or the amplitude can be allowed to change freely, by driving the control device with a constant frequency signal components, and the variations of said oscillation frequency and amplitude can be directly measured.

In a preferred embodiment, due to the use of a light source sending a light beam onto the surface of the vibrating microassembly, the direct measurement of the variations of the oscillation amplitude and/or frequency of the vibrating microassembly may be performed in simple and cheap manner by analysing the characteristics of the light beam reflected by the surface.

In a second preferred embodiment, due to the collaboration of the vibrating microassembly with an electric circuit, the direct detection of the variations of the oscillation amplitude and/or frequency of the vibrating microassembly may be performed in simple and cheap manner by analysing the variations of an electric quantity in the electric circuit, in particular of a current.

Advantageously, according to the second embodiment, the electric circuit may be at least partly integrated onto the supporting base of the vibrating microassembly.

Some preferred embodiments of the pressure sensor, given by way of non-limiting examples, will now be described in detail with reference to the accompanying drawings, in which:

BRIEF DESCRIPTION OF THE DRAWINGS

FIG. 7 is another schematic cross-sectional view of the vibrating microassembly and the control device of the sensor shown in FIG. 5;

FIG. 8 is yet another schematic cross-sectional view of the vibrating microassembly and the control device of the sensor shown in FIG. 5.

DETAILED DESCRIPTION OF THE INVENTION

Figure 1:
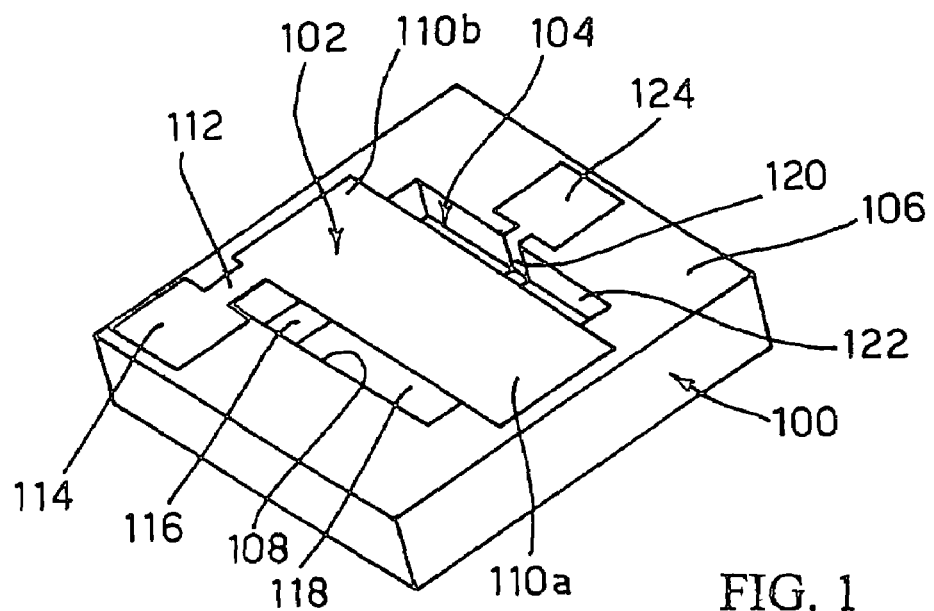
FIG. 1 is a perspective view of a microelectromechanical device (MEM) of the prior art that can be employed in a pressure sensor.
Figure 2:
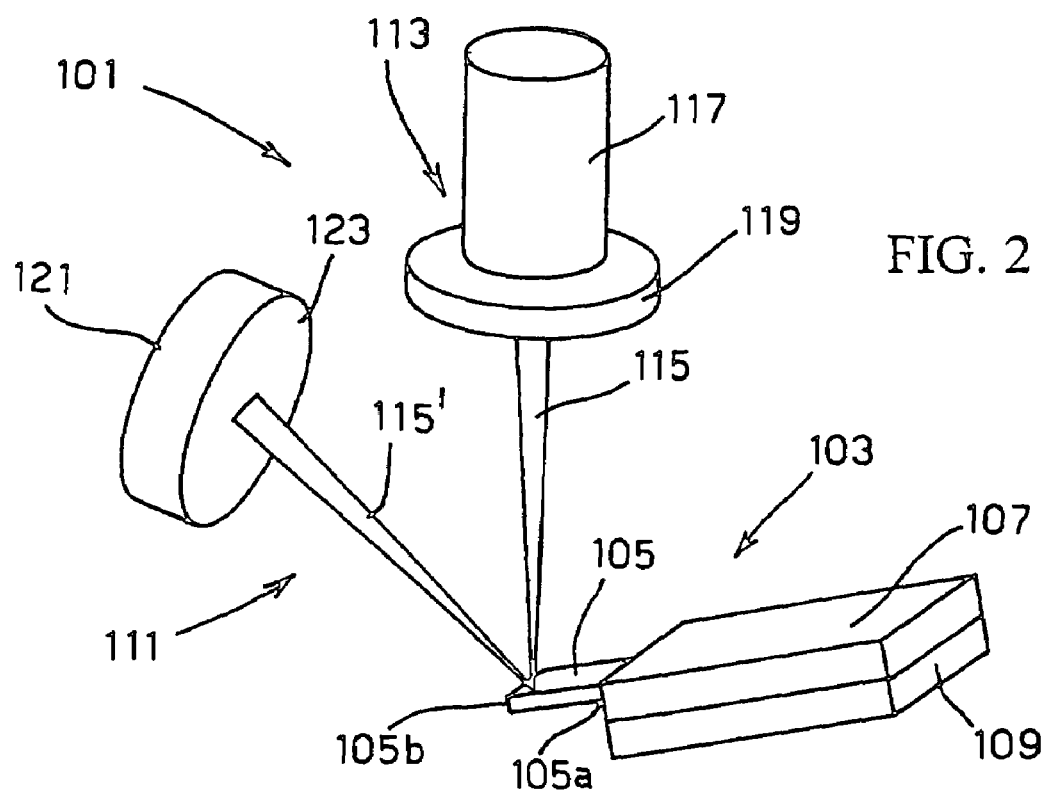
FIG. 2 is a schematic perspective view of a first embodiment of the pressure sensor according to the present invention.

Referring to FIG. 2, there is shown a first embodiment of the pressure sensor.

According to the first embodiment, pressure sensor 101 comprises a microelectromechanical device 103 having of a vibrating microassembly 105 fastened at one of its end 105a to a supporting base 107. The vibrating microassembly 105 is preferably formed as a beam with a length in a range of 200 to 800 micrometers, a width in a range of 40 to 100 micrometers and a thickness in a range of 1 to 50 micrometers. Supporting base 107 is joined, with a plate-shaped or disc-shaped piezoelectric member 109 allowing microassembly 105 to vibrate at known frequency and amplitude.

Gluing may connect supporting base 107 and piezoelectric member 109. Piezoelectric member 109 is connected to a function generator (not shown), generating an electric signal for driving the piezoelectric member 109 with the known and constant frequency components. This predetermined frequency comprises the theoretical resonance frequency of the vibrating microassembly under absolute vacuum conditions (intrinsic frequency), but it might also be another frequency imposed by the function generator.

According to this first embodiment of the invention, the means for detecting the deviations of the oscillation frequency and/or amplitude of vibrating microassembly 105 due to pressure variations in the surrounding environment, comprise an optical detection system 111.

The optical detection system 111 comprises a light source 113 directing an incoming light beam 115 onto the surface of the vibrating assembly 105, near free end 105b opposite to end 105a fastened to supporting base 107. The light source 113 comprises a solid state laser diode 117 and a focussing lens 119 allowing focussing incoming light beam 115 onto end 105b of vibrating microassembly 105. Preferably, the laser diode 117 emits a radiation in the red spectral region, at a wavelength of about 670 nm.

Optical detection system 111 further comprises a sensor 121 having a surface arranged to receive light beam 115' reflected by vibrating microassembly 105.

It is clear that, as the oscillation frequency and/or amplitude of the vibrating microassembly 105 have changed, the position of the point of incidence of reflected light beam 115' on surface 123 of sensor 121 is changed. In order to detect such variations of the oscillation frequency and/or amplitude, sensor 121 is suitably associated with an electric circuit (not shown) providing an electric current value varying depending on the position of the point of incidence of said reflected light beam 115' onto the surface 123.

Advantageously, said electric circuit may further include a differential and transresistance amplifier in order to convert the electric current value into a voltage value varying depending on the position of the point of incidence of reflected light beam 115' onto surface 123 of sensor 121.

Also, the electric circuit may further include, downstream the differential and transresistance amplifier, an amplifier equipped with a bandpass filter allowing passage of a very narrow frequency band centred about the resonance frequency of the vibration of the vibrating microassembly.

It is to be appreciated that, due to the variations of the oscillation amplitude and/or frequency of vibrating microassembly 105, reflected light beam 115' will travel over paths of different lengths to impinge onto surface 123 of sensor 121. Due to the attenuation of light beam 115', it might be possible to use, as an alternative to sensor 121, a sensor capable of supplying a current value varying depending on the intensity of reflected light beam 115', and not on the position of its point of incidence.

Figure 3:
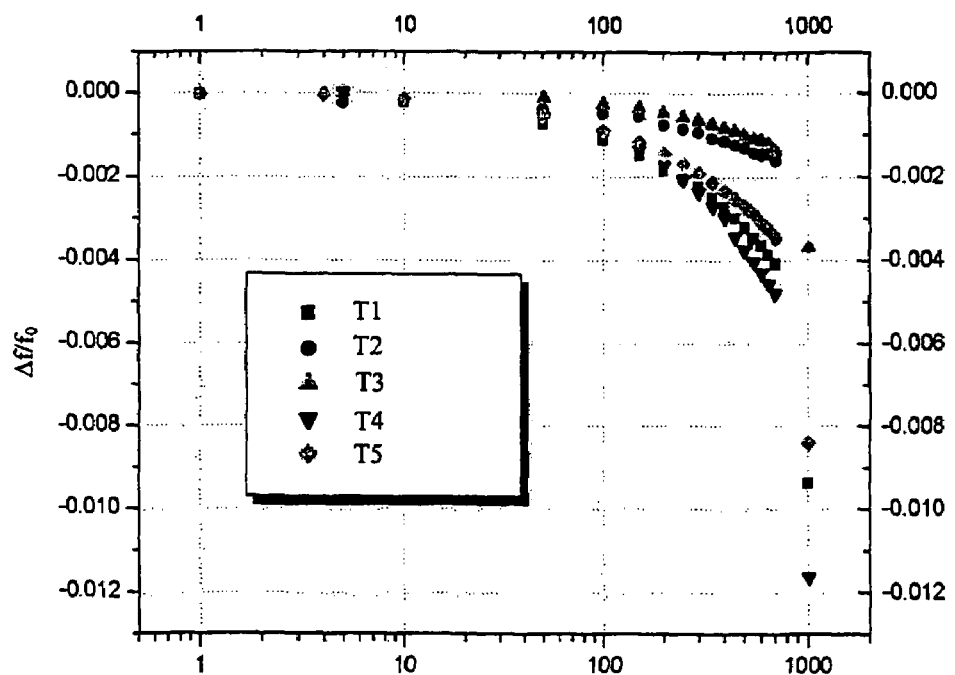
FIG. 3 is a graph showing the behaviour of the oscillation frequency variation versus pressure in the pressure sensor shown in FIG. 2, for vibrating microassemblies of different sizes.
Figure 4:
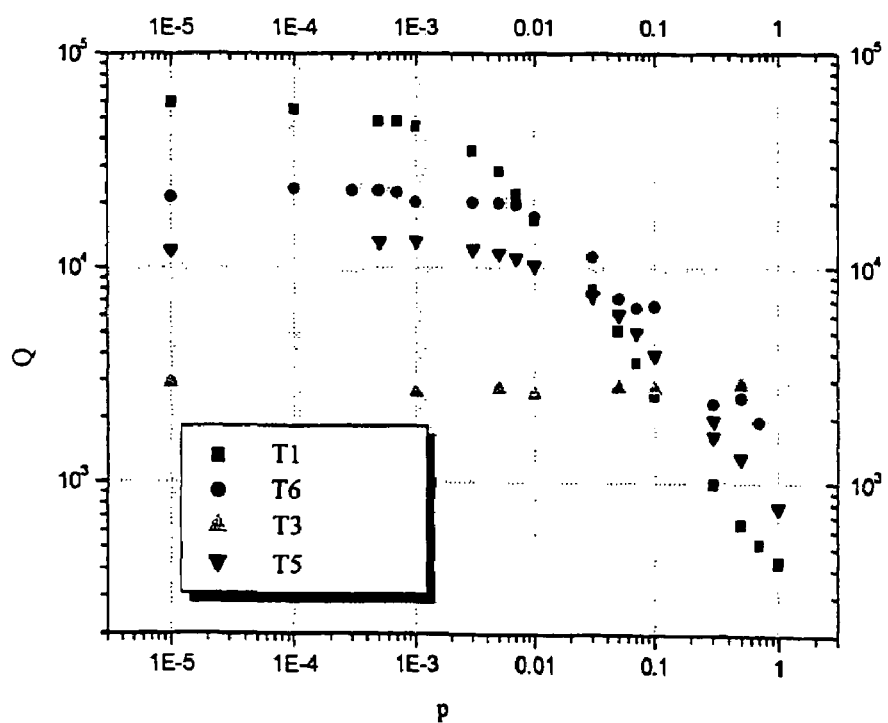
FIG. 4 is a graph showing the behaviour of the quality factor versus pressure in the pressure sensor shown in FIG. 2, for vibrating microassemblies of different sizes.

FIGS. 3 and 4 show the graphs of the oscillation frequency variation ($\Delta f/f_0$) and the quality factor (Q), respectively, as a function of the pressure in the environment surrounding sensor 101.

Each graph includes different curves, corresponding to vibrating microassemblies made as beams with different sizes, given in micrometers: as shown in Table 1

TABLE 1

| Beam | T1 | T2 | T3 | T4 | T5 | T6 |
|---|---|---|---|---|---|---|
| Length | 800 | 200 | 400 | 400 | 600 | 800 |
| Width | 100 | 40 | 100 | 100 | 100 | 100 |
| Thickness | 5 | 5 | 10 | 5 | 5 | 10 |

Referring to FIG. 3, there is shown the behaviour of the pressure variation, as a function of pressure p (in millibars), defined as:

$$\Delta f/f_0 = [f(p)-f_0]/f_0,$$

where f(p) is the resonance frequency at pressure p, $f_0$ is the intrinsic frequency.

Under term "intrinsic frequency" it is contemplated the resonance frequency in the intrinsic pressure region (i.e., at pressure values lower than $10^{-3}$ mbar), where the resonance frequency does not depend on the surrounding environment conditions. In other words, the intrinsic frequency may be considered as the resonance frequency expected under absolute vacuum conditions.

The graph in FIG. 3 clearly shows the increment (in absolute value) of the pressure variation versus pressure in the pressure range between 1 and $10^3$ mbar for all considered specimens. At pressures of the order of or lower than 1 mbar, on the contrary, $f(p) \cong f_0$, and hence $\Delta f$ quickly tends to 0. Thus, by relying on the measurement of the resonance frequency variation only, the pressure sensor according to the invention is reliable for use at pressures higher than 1 mbar.

FIG. 3 clearly shows that the pressure sensor according to the invention allows for a direct measurement of the variation of the resonance frequency of the vibrating microassembly. The microassembly is allowed to freely vibrate at the frequency and amplitude set by the pressure in the surrounding environment, while keeping the driving frequency of the control device constant as the pressure varies.

The analysis of the curves of the graph of FIG. 3, proves that the sensitivity of the pressure sensor, in terms of the slope of the frequency variation curve, increases as the microassembly thickness decreases. It clearly appears from a comparison of the curves relating to specimens T3 and T4. Moreover, at constant thickness, this sensitivity increases as the microassembly surface area increases, as it clearly appears from a comparison of the curve relating to specimen T2 with the curves relating to specimens T1, T4 and T5.

Turning now to FIG. 4, there is shown the behaviour of quality factor Q, as a function of pressure p (in millibars), defined as the ratio between the frequency value at the resonance peak and the half-height width of the resonance curve itself. The graph in FIG. 4 clearly shows the increment of quality factor Q as pressure decreases in the pressure range between 1 and $10^{-3}$ mbar for almost all considered specimens. At pressures lower than $10^{-3}$ mbar the above mentioned intrinsic region is entered and therefore no further increment in quality factor takes place. Thus, by virtue of the combined measurement of the resonance frequency variation and the quality factor variation, the pressure sensor according to the invention is utilisable with good reliability at pressures ranging from $10^3$ to $10^{-3}$ mbar.

The analysis of curves of the graph shown in FIG. 4, proves that the sensitivity of the pressure sensor, also in terms of the slope of the quality factor curve, increases as the microassembly thickness decreases. It clearly appears from a comparison of the curves relating to specimens T1 and T6. Moreover, at constant thickness, the sensitivity increases as the microassembly surface area increases, as it clearly appears from a comparison of the curve relating to specimen T3 with the curves relating to specimens T1 and T5.

Figure 5:
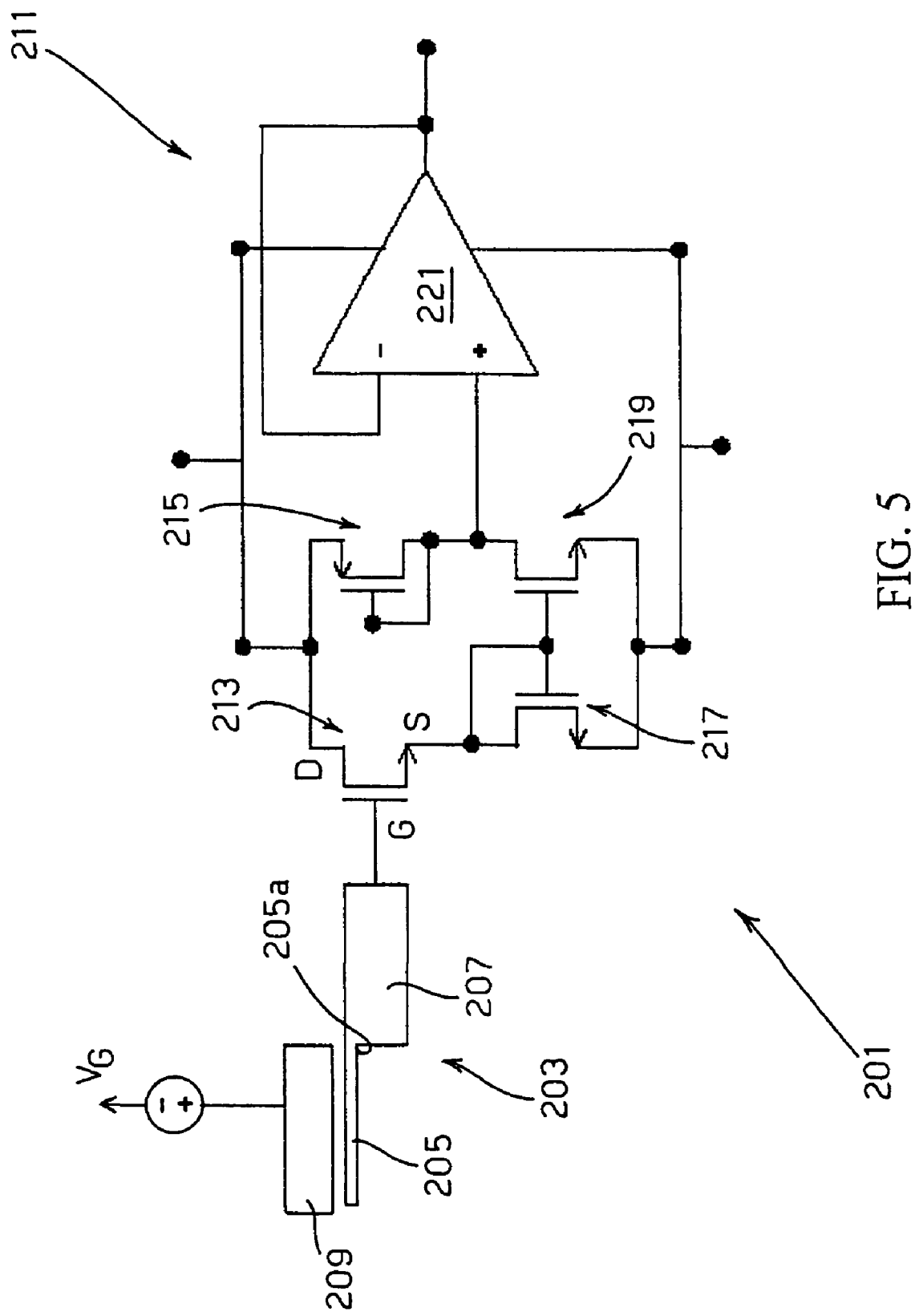
FIG. 5 schematically shows a second embodiment of the pressure sensor according to the present invention.

Turning to FIG. 5, there is shown a second embodiment of the pressure sensor according to the invention. According to the second embodiment, pressure sensor 201 includes a microelectromechanical device 203 comprising of a vibrating microassembly 205 fastened at one end 205a to a supporting base 207. The vibrating microassembly 205 is preferably formed as a beam with a length in a range of 200 to 800 micrometers, a width in a range of 40 to 100 micrometers and a thickness in a range of 1 to 50 micrometers, Supporting base 207 is joined with an electrode 209 allowing microassembly 205 to vibrate at known frequency and amplitude. The electrode 209 is connected to a voltage generator (not shown), generating an electric signal with said known frequency. More particularly, according to the invention, the voltage generator drives electrode 209 with constant frequency components. The known and constant frequency components comprising the theoretical resonance frequency of the vibrating microassembly under absolute vacuum conditions (intrinsic frequency), but it might also be another frequency imposed by the voltage generator.

According to this first embodiment of the invention, the means for detecting the deviations of the oscillation frequency and/or amplitude of vibrating microassembly 205 related with pressure variation in the surrounding environment comprise an electric circuit 211. In electric circuit 211, vibrating microassembly 205 is used as gate G of a MOSFET transistor 213. As known, a MOSFET transistor, for instance of the N-channel type, comprises a low-doping P silicon substrate where two high-doping N regions (referred to as source S and drain D) are formed. A control electrode, the so-called, gate G, is located between such regions. By varying the voltage applied to gate G, the charge distribution and density in the underlying substrate region between source S and drain D are varied by electric field effect, thereby creating a so-called channel. In the case described above, being the substrate of P type, the channel will be of N type, i.e. it will allow an electron current to flow. In case of N-type substrate, the channel created by the potential of gate G will allow a hole current to flow (P-type channel). Thus, the MOSFET is a device controlling current $I_D$ flowing therethrough, which current enters at a source S and flows out at a drain D, by a suitable biasing of the third pole, gate G.

Should vibrating microassembly 205 be used as gate G and this assembly be biased at a constant voltage $V_G$, a resulting voltage signal will be the superposition of a constant d.c. signal and a frequency signal, since the gate channel extension will vary depending on the amplitude and frequency of the vibrating assembly oscillation.

Therefore, during the oscillations of the vibrating microassembly, current $I_D$ varies, in intensity and frequency, proportionally to the variations of the amplitude and frequency of said oscillations, and the measurement of the current variations allow directly obtaining the frequency and amplitude variations of the vibration of vibrating microassembly 205, and consequently the pressure variations in the environment surrounding said assembly.

In the circuit shown in FIG. 5, drain D of the MOSFET 213 of which vibrating microassembly 205 forms gate G, is connected to the drain of a second MOSFET 215 (parallel connection), identical to the first MOSFET 213 but having a non-variable gate. The sources of said MOSFETs 213, 215 are connected to the drains of third and fourth MOSFETs 217, 219, respectively (serial connection). Said third and fourth MOSFETs 217, 219 are identical and act as stabilising resistors making the circuit more stable.

Besides MOSFETs 213, 215, 217, 219, electric circuit 211 preferably comprises an amplifier 221 amplifying the output current in order to increase the sensitivity of sensor 201.

It is to be appreciated that, advantageously, electric circuit 211 may be at least partly integrated onto supporting base 207, in order to further reduce the overall size of sensor 201. More particularly, both MOSFETs 213, 215, 217, 219 and amplifier 221 may be integrated onto the supporting base 207.

Figure 6:
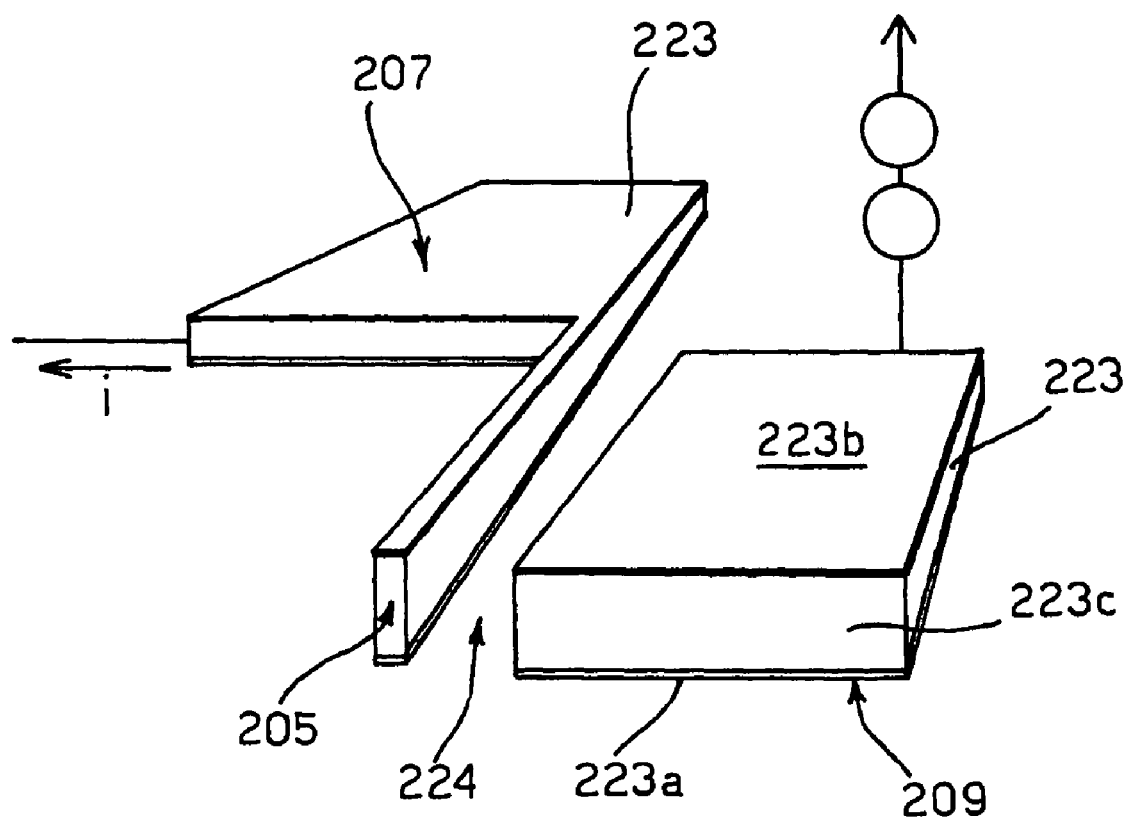
FIG. 6 is a schematic perspective view of the vibrating microassembly and the control device of the sensor shown in FIG. 5.

FIG. 6 shows in detail vibrating microassembly 205 and electrode 209 of pressure sensor 201. The vibrating microassembly 205, jointly with supporting base 207, and said electrode 209 are formed from a wafer 223 consisting of a first and a second silicon layer 223a, 223b, arranged parallel to each other, and of an intermediate layer 223c of silicon oxide.

Electrode 209 is formed from a portion of the first silicon layer 223a of the wafer 223. Vibrating microassembly 205 is formed near the portion of the first silicon layer 223a, and is made as a silicon beam arranged in a plane perpendicular to the first and second silicon layers 223a, 223b. It is formed by removing the surrounding portion of wafer 223, thereby creating a cavity 224 between microassembly 205 and electrode 209, within which cavity the microassembly can freely oscillate once excited.

Thus, the microassembly 205, due to the electric field generated between it and electrode 209, vibrates in a direction parallel to the first and second silicon layers 223a, 223b and, ultimately, in a direction parallel to the electrode 209.

FIG. 7 shows in detail vibrating microassembly 205 and electrode 209 of pressure sensor 201 according to a first variant embodiment, which differs from what has been shown and described with reference to FIG. 6 in that microassembly 205 vibrates in a direction perpendicular to said electrode 209. The vibrating microassembly 205, jointly with supporting base 207, and said electrode 209 are formed from a wafer 225 consisting of a first and a second silicon layer 225a, 225b, arranged parallel to each other, and of an intermediate silicon oxide layer 225c (SOI wafer). Electrode 209 is formed from a portion of the first silicon layer 225a of the wafer 225, and vibrating microassembly 205 is formed from a corresponding portion of the second silicon layer 225b of the wafer 225, which portion is arranged above said electrode. Intermediate silicon oxide layer 225c in wafer 225 is correspondingly removed, so as to create a cavity 227 below microassembly 205, in order to allow said vibrating microassembly to freely oscillate. Both electrode 209 and microassembly 205 are equipped with contact areas 229 and 231, respectively, for connection to an electric circuit, more particularly an electric circuit like circuit 211 shown in FIG. 2.

Also in this variant, vibrating microassembly 205 is formed as a beam fastened at one end to supporting base 207. In the present case, however, said beam is arranged in a plane parallel to said first and second silicon layers 225a, 225b, and it vibrates in a direction perpendicular to said first and second silicon layers 225a, 225b and, ultimately, in a direction perpendicular to said electrode 209.

FIG. 8 shows in detail vibrating microassembly 205 and electrode 209 of pressure sensor 201 according to a second variant embodiment, which differs from what has been shown and described with reference to FIG. 7 in that microassembly 205 and electrode 209 are formed on two different wafers. The vibrating microassembly 205, jointly with supporting base 207, is formed from a wafer 233 consisting of a first and a second silicon layer 233a, 233b, arranged parallel to each other, and of an intermediate silicon oxide layer 233c (SOI wafer). More particularly, vibrating microassembly 205 is formed from a portion of second silicon layer 233b of the wafer 233. Intermediate layer 233c of silicon oxide of wafer 233 is correspondingly removed, so as to create a cavity 237 below microassembly 205, in order to allow said vibrating microassembly to freely oscillate. According to this variant, a Pyrex wafer 239 is coupled (by bonding) to SOI wafer 233, and more particularly to second silicon layer 233b in said wafer. The portion of said Pyrex wafer 239 located in correspondence with microassembly 205 is removed, so as to create a cavity 241 above said microassembly, in order to allow the latter to freely oscillate. Contact area 243 of electrode 209 for connection to an electric circuit, more particularly a circuit like circuit 211 shown in FIG. 5, is provided inside said cavity 241, more particularly in the wall above said microassembly 205; a similar contact area 245 is likewise applied to the face of microassembly 205 opposite electrode 209. As in the variant shown in FIG. 7, also in this second variant vibrating microassembly 205, still formed as a beam, vibrates in a direction perpendicular to electrode 209.

It is clear that the sensor according to the invention, made according to any of the embodiments and the variants disclosed, attains the set aims: actually, since the detection of the variations of the oscillation frequency and/or amplitude of the vibrating microassembly is not a capacitive detection, it is possible to achieve a direct detection of the oscillation frequency and amplitude deviations from the expected values, due to pressure variations in the surrounding environment.

It is also clear that, thanks to the very reduced size, the satisfactory sensitivity and the possibility of operating in a wide pressure range ($10^3$ to $10^{-3}$ mbar), the sensor according to the invention can advantageously be utilised in several applications.

By way of non-limiting example, in the field of vacuum pumps, and in particular vacuum pumps comprising a rotor and a stator co-operating together to obtain the pumping effect, the sensor according to the invention, thanks to its size, could be introduced into the vacuum pump and located between the stator and the rotor, without any difficulty depending on the size and without giving rise to significant perturbations.

What is claimed is:

1. A pressure sensor comprising:
   a wafer having a silicon oxide layer sandwiched between a first and a second paralleled to each other silicon layers;
   a control device formed from a portion of said first silicon layer; and
   a vibrating microassembly formed as a silicon beam in proximity to said portion of the first silicon layer, arranged in a plane perpendicular to the silicon layers and fastened to a supporting base; the silicon oxide layer being removed to create a cavity below said vibrating microassembly, wherein said control device is driven by a signal of a predetermined frequency components, which under absolute vacuum conditions makes said microassembly to freely oscillate within the cavity relative to said supporting base at a known frequency and amplitude.

2. The pressure sensor as claimed in claim 1, further comprising an optical detection system detecting deviations of the frequency and/or amplitude of oscillation of said microassembly from the known frequency and/or amplitude, which comprises:

a light source for directing an incoming light beam onto a surface of said vibrating microassembly; and a sensor having a surface arranged to receive a light beam reflected by said vibrating microassembly, and at least one electric contact providing a current value varying depending either on the intensity of said reflected beam when impinging onto said surface or on the position of the point of incidence of said reflected beam onto said surface.

3. The pressure sensor as claimed in claim 2, wherein said light source comprises a solid state laser diode.

4. The pressure sensor as claimed in claim 3, wherein said control device includes a piezoelectric element, which is connected to said supporting base of said vibrating microassembly.

5. The pressure sensor as claimed in claim 4, wherein said vibrating microassembly is a beam having a length in the range 200 to 800 micrometers, a width in the range 40 to 100 micrometers and a thickness in the range 1 to 50 micrometers.

6. The pressure sensor as claimed in claim 5, wherein the frequency component of a signal driving said control device is equal to the intrinsic frequency of said vibrating microassembly.

7. A method of pressure detection, comprising the steps of:

providing a vibrating microassembly formed as a silicon beam and fasten to a supporting base, positioned in proximity to a wafer consisting of a pair of mutually parallel silicon layers sandwiching a silicon oxide layer, and arranged in a plane perpendicular to a plane of the layers;

making the vibrating microassembly oscillate relative to the supporting base within a cavity created by removing the silicon oxide layer at frequency and amplitude depending on a surrounding environmental pressure by a control device formed from a portion of one of the silicon layers and being driven by a constant frequency signal components;

generating a light beam from a light source;

directing said light beam onto a surface of said vibrating microassembly;

providing an optical sensor having a surface arranged to receive the light beam reflected by the vibrating microassembly, and at least one electric contact providing a value of an electric parameter varying depending on the position of the point of incidence and/or on the intensity of the reflected beam at the surface; and measuring the variations of said electric parameter to obtain the frequency and/or amplitude variations of the vibrating microassembly.

8. The method of pressure detection as claimed in claim 7, further comprising the step of amplifying the variations of the electric parameter before measuring said variations, wherein said electric parameter is an electric current or an electric voltage.

9. A pressure sensor comprising:

a wafer having a first and a second silicon layers arranged parallel to each other and an intermediate layer of silicon oxide there between;

a vibrating microassembly formed as a silicon beam arranged in a plane perpendicular to said first and second silicon layers and fastened to a supporting base;

a control electrode formed from a portion of said first silicon layer in proximity to said vibrating microassembly, a portion of said wafer between said vibrating microassembly and said control electrode being removed to create a cavity therein, said control electrode driven by a signal with predetermined frequency components, which under absolute vacuum conditions makes said microassembly to freely oscillate relative to said supporting base at a known frequency and amplitude; and means for detecting the deviations of the frequency and/or amplitude of said oscillation of said microassembly from said known frequency and/or amplitude comprising an electric circuit in which at least one electric parameter is variable depending on the oscillation amplitude and/or frequency of said vibrating microassembly.

10. The pressure sensor as claimed in claim 9, wherein said electric circuit includes a MOSFET transistor, said vibrating microassembly acting as control electrode or gate (G) of said MOSFET transistor.

11. The pressure sensor as claimed in claim 10, wherein said MOSFET transistor comprising said vibrating assembly as its gate is connected in parallel with a second MOSFET transistor.

12. The pressure sensor as claimed in claim 11, wherein said first and second MOSFET transistors are connected in series with a third and a fourth MOSFET transistor, respectively.

13. The pressure sensor as claimed in claim 12, wherein said electric circuit is at least partly integrated onto said supporting base of said vibrating microassembly.

14. The pressure sensor as claimed in claim 13, wherein said vibrating microassembly oscillates in a direction parallel to said control electrode.

15. The pressure sensor as claimed in claim 13, wherein said vibrating microassembly oscillates in a direction perpendicular to said control electrode.

16. A pressure sensor comprising:

a wafer consisting of a first and a second silicon layers arranged parallel to each other, and of an intermediate layer of silicon oxide;

control electrode formed from a portion of said first silicon layer; and vibrating microassembly formed from a portion of said second silicon layer facing said portion of said first layer, the intermediate silicon oxide layer being removed to create a cavity below said vibrating microassembly in order to allow said vibrating microassembly to freely oscillate in a direction perpendicular to said control electrode.

17. The pressure sensor as claimed in claim 16, further comprising an additional wafer superimposed to said second silicon layer of said wafer; wherein an additional cavity formed in said additional wafer, in correspondence with said vibrating microassembly said control electrode is located inside said additional cavity of said additional wafer.

* * * * *